4 Sheets—Sheet 1.

H. R. SMITH.
PIPE MOLDING MACHINE.

No. 190,634. Patented May 8, 1877.

WITNESSES

Wm. A. Skinkle
F. Stich

INVENTOR

Herbert R. Smith.

By his Attorneys,
Baldwin, Hopkins & Peyton

H. R. SMITH.
PIPE MOLDING MACHINE.

No. 190,634. Patented May 8, 1877.

4 Sheets—Sheet 2.

WITNESSES

INVENTOR
Herbert R. Smith
By his Attorneys,
Baldwin, Hopkins & Peyton.

H. R. SMITH.
PIPE MOLDING MACHINE.

No. 190,634. Patented May 8, 1877.

WITNESSES

INVENTOR
Herbert R. Smith.
By his Attorneys.

4 Sheets—Sheet 4.
H. R. SMITH.
PIPE MOLDING MACHINE.
No. 190,634. Patented May 8, 1877.
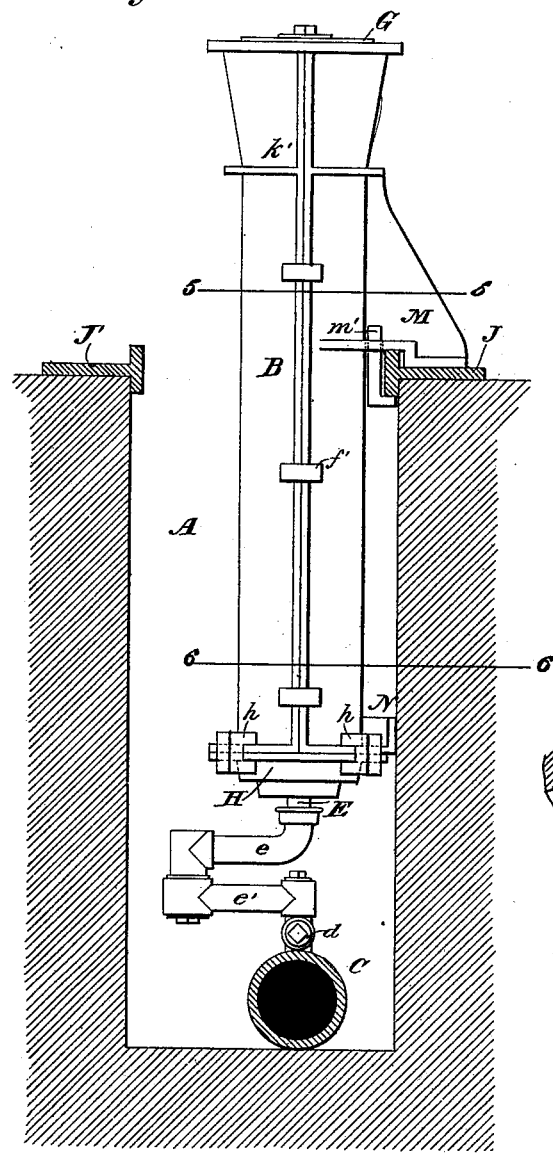
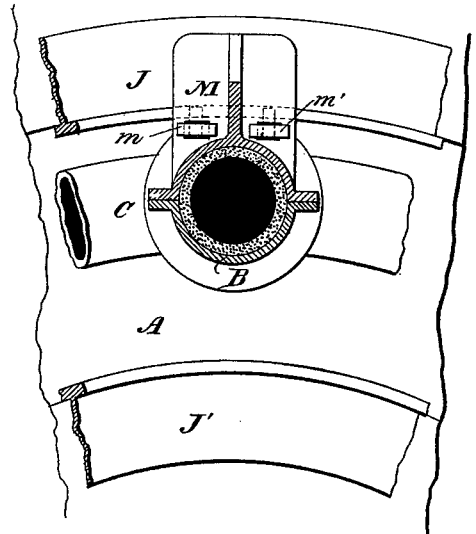
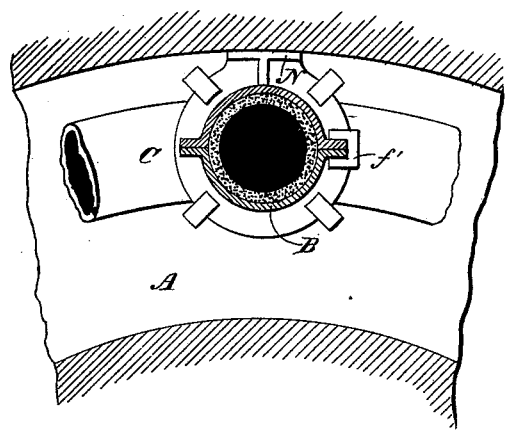
WITNESSES
Wm. A. Skinkle
F. Fish
INVENTOR
Herbert R. Smith.
By his Attorneys.
Baldwin, Hopkins & Peyton

UNITED STATES PATENT OFFICE.

HERBERT R. SMITH, OF COLUMBUS, OHIO.

IMPROVEMENT IN PIPE-MOLDING MACHINES.

Specification forming part of Letters Patent No. 190,634, dated May 8, 1877; application filed March 30, 1877.

*To all whom it may concern:*

Be it known that I, HERBERT R. SMITH, of Columbus, in the county of Franklin and State of Ohio, have invented certain new and useful Improvements in the art of Molding and Casting Pipe, and in apparatus therefor, of which the following is a specification:

My invention relates to improvements chiefly adapted for use in the method of molding and casting pipe, tubular columns, and other hollow articles known as the "vertical method," or that in which the flasks are arranged upright in a suitable pit, chamber, or place. My improvements resemble, in some respects, the invention shown and described in Letters Patent of the United States, No. 179,669, granted to myself and Nicholas K. Wade on the 11th day of July, 1876.

My object mainly is cheaply, thoroughly, and expeditiously to dry a mold or series of molds by heat generated inside the mold or molds themselves; and, further, my objects are to adapt the apparatus to the drying of molds, either by jets of flame impinging directly upon or nearly upon the insides of the molds or by the introduction of heated air; to facilitate the adjustment of the molds in the pit or chamber; to provide for the ready removal of the flasks, and for the securing in position of flasks of different sizes; and generally to improve the apparatus or devices employed for molding, and for drying by heat derived from burning gas-jets.

The subject-matter claimed will hereinafter specifically be designated.

In the accompanying drawings all my improvements are shown as embodied in the best way now known to me for conjoint use, in connection with a molding or casting pit or trench. Obviously, however, my improvements may be modified in details, and some of the parts or devices may be used without the others, as well as in connection with devices differing from those therein shown in some respects.

Figure 1:
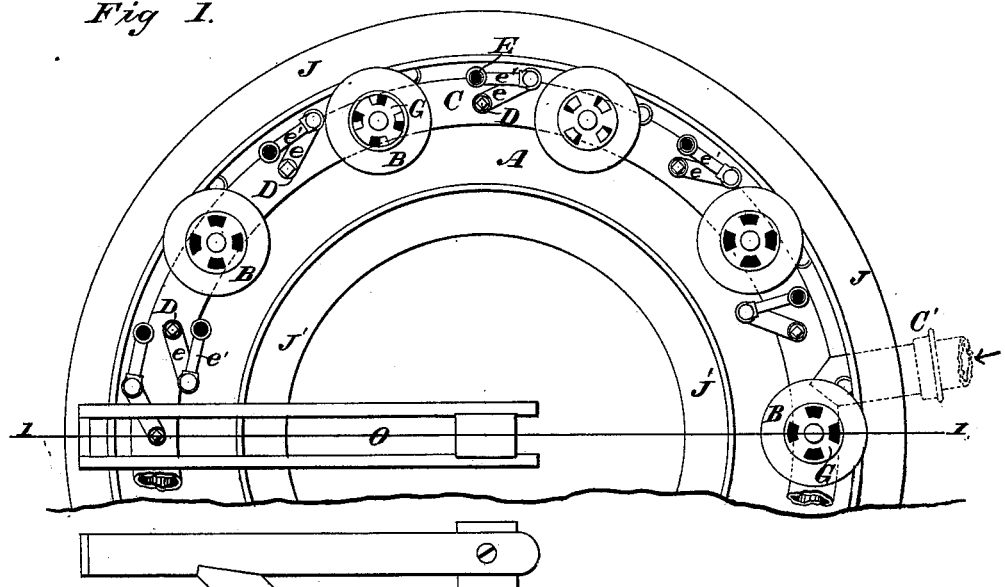
Figure 2:
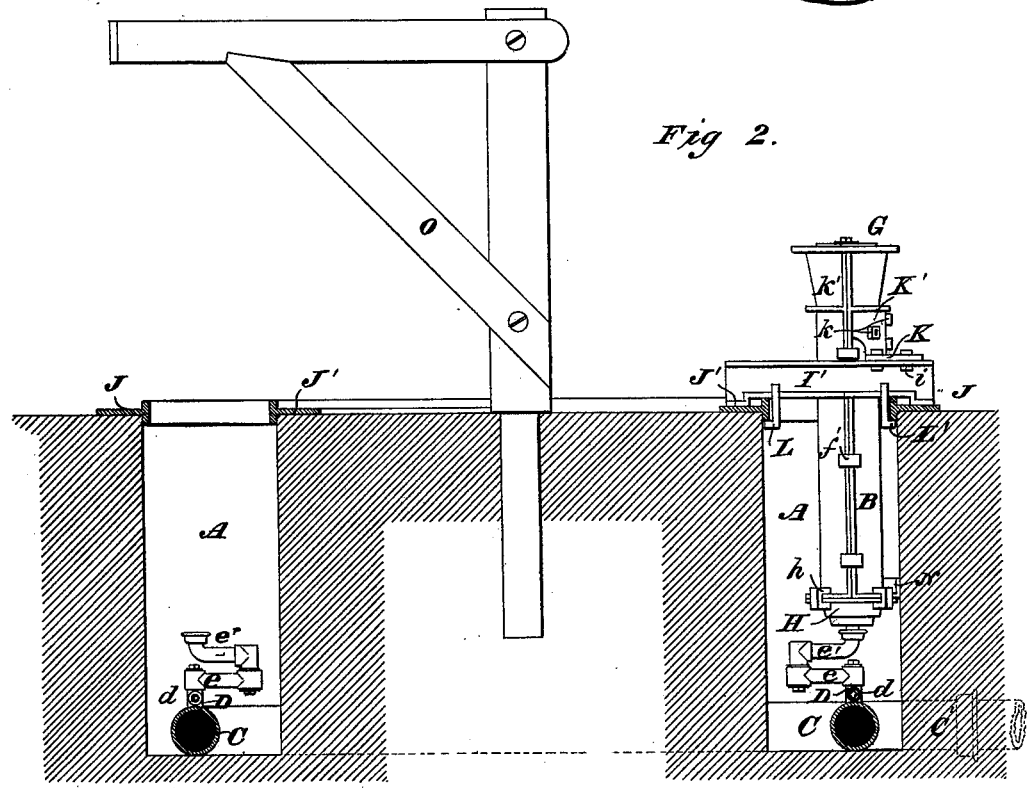
Figure 3:
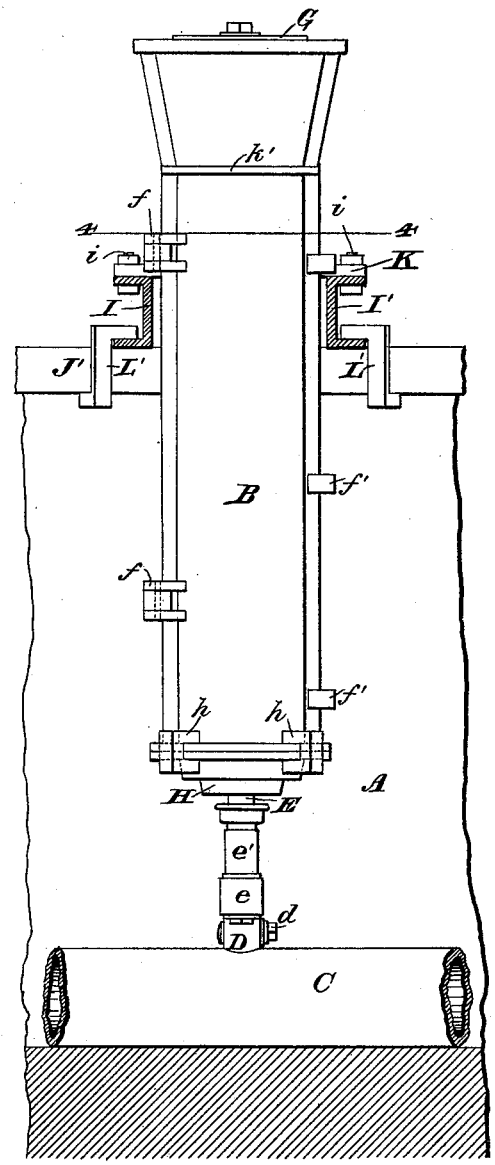
Figure 4:
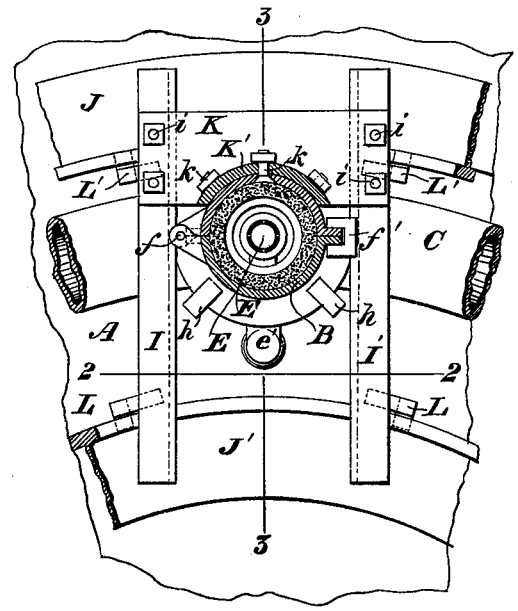
Figure 5:
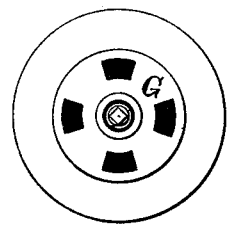
Figure 6:
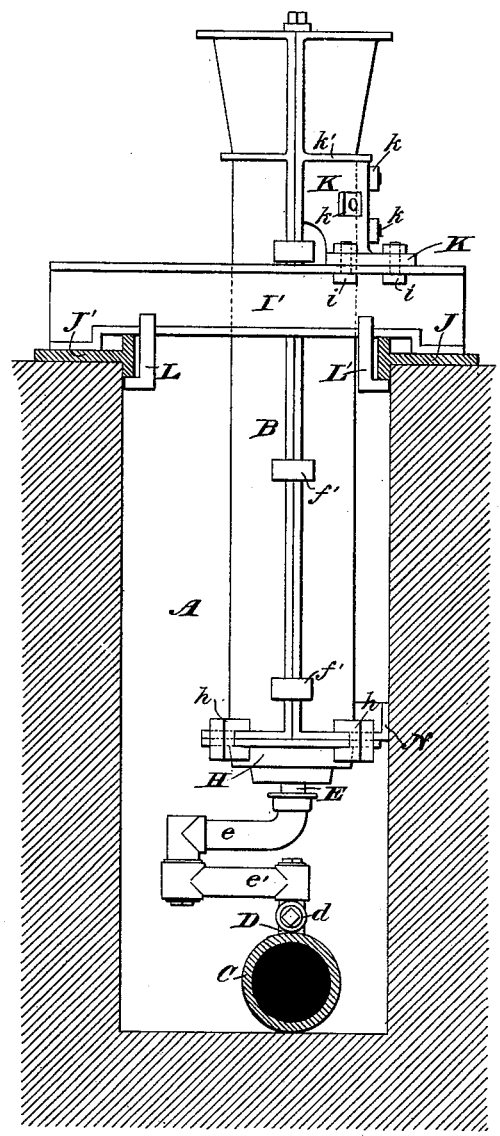
Figure 7:
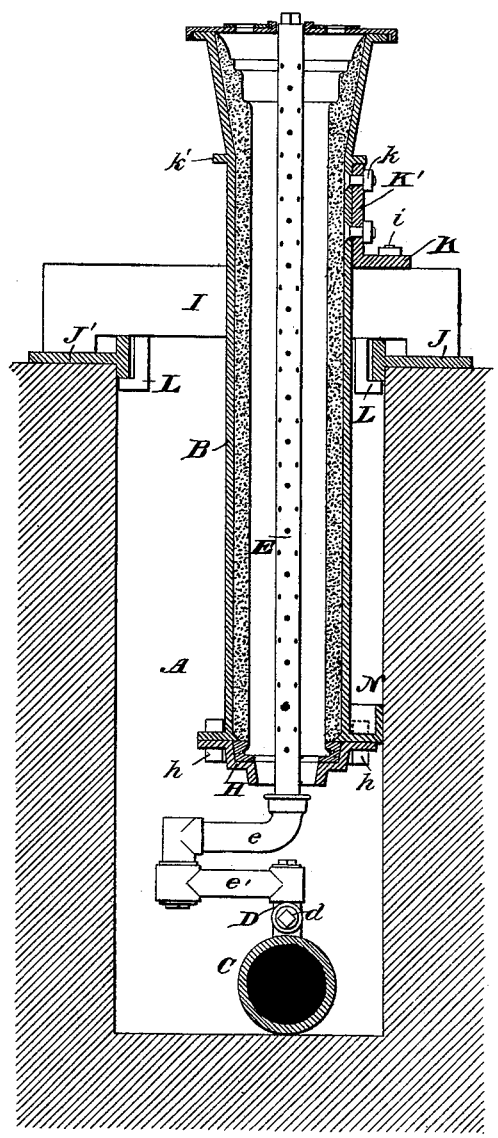

Figure 1 is a plan or top view of a portion of the pit and the supply-pipe for conducting inflammable gas or heated air to the mold-heating tubes or branch pipes of the flasks; Fig. 2, a vertical section on the line 1 1 of Fig. 1. Fig. 3 is an elevation, partly in section, on the line 2 2 of Fig. 4, showing one of the flasks suspended in position in the pit; Fig. 4, a plan or top view of the same, with the flask, mold, and heating-pipe in section on the line 4 4 of Fig. 3; Fig. 5, a plan view, showing the removable register or regulator-cap of a flask, for controlling the escape of or confining the heat within the flask or mold. Fig. 6 is a view partly in elevation and partly in section, showing a flask clamped in position in the pit; Fig. 7, a vertical central section of the same on the lines 3 3 of Fig. 4, and 1 1 of Fig. 1. Fig. 8 is a view similar to Fig. 6, showing a modification of my invention, and Figs. 9 and 10 are views of the same, partly in section, on the lines 5 5 and 6 6, respectively, of Fig. 8, and partly in plan.

A pit, A, for molding, drying, and casting, may be of any desired shape to suit the views of the constructor or to utilize the space at disposal, and may be constructed in any suitable well-known way. It is, however, by preference, made of circular form, and adapted to receive any desired number of flasks, B. A portion of the pit might be set apart to dry the cores, or the flasks be arranged in a double row, as described in the Letters Patent of Smith and Wade, hereinbefore referred to.

A supply-pipe or conducting-tube, C, located at the bottom of the pit, and extending all around it, or such distance as may be desired, or upon the floor or ground near the wall or support to which the flasks are secured, in case a pit should not be employed, is connected at C' with a suitable pipe or conductor leading from the supply or reservoir of gas, when gas is used, or with a suitable hot-blast furnace, when heated air is employed to dry the molds, as in the before-mentioned Letters Patent of Smith and Wade. A regulating-valve may be provided in the connecting-pipe C' to cut off or adjust the supply of gas from the main pipe or reservoir or heated air from the furnace.

The supply-pipe C, instead of resting upon the bottom of the pit, might be supported in the pit-wall, or embedded in the bottom of the pit, to protect and partially or wholly conceal it.

The heated air or inflammable gas is led to the molds in the flasks by means of short pipes D, one for every flask, projecting from the supply-pipe, and each provided with a cock or regulating-valve, $d$, by which communication between the supply-channel C and different pipes D may independently be adjusted to shut off entirely the passages to the pipes or regulate the quantity of gas or hot air which is allowed to pass to any one or more of the various branch pipes D.

Mold-heating tubes E are connected with the short branch tubes D, either directly or by the intervention of jointed swinging tubular arms $e\ e'$, common in gas fixtures. The jointed connection is preferable, as it enables the heating-pipes E to be adjusted so as to bring them into the proper positions to adapt them for the use in drying molds of different sizes.

The heating-pipes are perforated with small openings to allow the escape of the heated air in jets, or to admit of the gas being burned in numerous small flames. Gas-burners may be secured in the jet-openings, and a comparatively small number of larger flames of gas would be sufficient to dry the molds; but I prefer the perforated pipe having numerous openings all around it from end to end of the flask and mold therein, as such pipes are cheaply made, and dry the molds most effectually by the heat generated by the burning gas-jets. Moreover, these same pipes may be used for drying the molds by heated air in a uniform manner throughout their length. The heating-pipes are, by preference, detachably connected to the outer ends of the jointed swinging arms (or directly to the branch pipe D) by screw-threads or in other well-known way. By these means should the heating pipes become burned out or otherwise injured new ones may be substituted.

Flasks B, preferably of wrought-iron, are made in two longitudinal sections, as usual, one part hinged to the other at $f$, and having removable clamps $f'$, to hold the sections closed together. Each flask has a movable or detachable register or damper valve, G, at top, by which to confine the heat to the mold or allow it to escape, as desired. When hot air is used these dampers serve as draft-regulators as well as heat-controllers.

The flask bottoms H are detachably connected to the body of the flask by means of clamps $h$, in a well-known way. A bead-ring or chill-ring, such as described in the before-mentioned Letters Patent of Smith and Wade, rests in the recess or seat in the bottom made to receive it.

Each flask is removably suspended in position above the supply-pipe in such manner that while one section thereof shall be held in a fixed position, the other section may be opened simply by knocking off the clamps $f'$ and those, $h$, which secure the movable portion of the flask and bottom together, the bottom still being held in place by the clamps which secure it to the fixed part of the flask.

The flasks are also suspended in place in such manner that they may readily be adjusted along the wall of the pit, and so that any desired sizes of flasks may be suspended over the supply-pipe.

Cross-bars I I', spanning the pit and resting on the plates J J' at the inner edges of the pit-walls, are connected by a wide plate, K, which is detachably united at its opposite ends by screws $i\ i$, or otherwise, to the flanged spanning-bars I I'. Projecting upward from the inner edge of the cross-plate K is a curved flange or bracket-support, K', to which one half or section of the flask is fastened by bolts $k$, passing through the flask wall or side, and countersunk on the inner surface thereof. The adjacent surfaces of the supporting-bracket K' and flask should be of corresponding curvature, and the upper end or edge of the support rest against the flange $k'$ of the flask. Clamping-clips L L L' L', serve to secure the adjustable supporting-frame (composed of the spanning-bars, the plate connecting them, and the supporting flange or bracket thereon) in any desired position. The clamps, it ill be noticed, engage the lower flanges of the spanning-bars I I' and the pit-plates J J', and may be readily tightened by driving them toward the pit-walls, or knocked off for the removal or independent adjustment of the flask-suspending frames. Different cross-plates and supports, K and K', are employed to suit the sizes of the flasks. The same spanning-bars and clamps may, however, be used for all sizes of pipe, and the flasks adjusted by them both crosswise and lengthwise of the pit to bring them in proper position relatively to the supply-pipe and heating-pipes. The cross-plate K and support K' may be cast with the flask when it is made of cast-iron, if preferred.

For heavy pipe the manner just described of suspending the flasks I deem preferable; but for light flasks and pipe the modifications shown by Figs. 8, 9, and 10 may be employed. By those figures of the drawing it will be seen that the suspending frame spanning the pit from wall to wall is dispensed with, and means provided for supporting the flask from a single wall or support, or at one side only of the pit-wall. Instead of the cross-plate and its bracket or supporting-flange bolted to the flask, a flanged bracket or support, M, is cast with one half or section of the flask B; but when the flask is made of wrought-iron, and, if desired, when made of cast-iron, the bracket may be made separate, and bolted in place, and T-headed clips $m\ m'$ passing through slots in the brace of the bracket and hooking under the pit-plate J, serve, as will readily be perceived, to securely, and yet adjustably and detachably, fasten the flask in place. A bearing or offset, N, at or near the lower end of the flask, formed with or separate therefrom, bears against the wall or takes into one of a series of slots or recesses in the wall or in a plate secured thereto. These offsets N may be employed in connection with the suspending-frames, as shown.

The operation for molding and casting is as follows: The flask having been suspended in position, the bead-rings are inserted, which is readily done by opening the swinging sections of the flasks. The flasks are then closed, the sections clamped together, and the bottoms secured. The patterns are next inserted—hollow patterns to fit over the heating pipes being, by preference, employed, though solid patterns may be used by unscrewing the heating-pipes and detaching them and again attaching them when the patterns are removed—and the sand is rammed, as usual, and the patterns removed before blackwashing. After blackwashing, preferably in the manner and by the means shown and described in the application of Nicholas K. Wade for Letters Patent of the United States, filed simultaneously herewith, and entitled "Improvements in Blackwashing Pipe-Molds," the gas, which is used in preference to hot air, is turned on and lighted. The heat thus generated wholly within the molds, rapidly and uniformly dries them. In case the pipes are to be cast when the molds are hot, it is only necessary to "skin-dry," or dry the surface of the molds. If the heat should become too great, it may readily be regulated by turning the cocks in the supply-tubes, as well as by allowing it to escape in greater quantities at the top of the flasks by the registers. When the molds, or any desired number of them, have been dried, the gas (or hot air) is shut off, the prepared cores lowered into the molds by means of any suitable overhead railway hoisting and lowering apparatus or system of cranes, a single crane, O, being shown in the drawings for the purpose of illustration. The heating-pipes E may be left in place when the core is inserted, provided the usual hollow core-barrels are used. The casting now takes place, the ladle for the molten metal being carried by the crane, or in other suitable well-known way, to each mold in turn. When ready for stripping or dumping the flasks are swung open, the clamps $f'$ being first removed with those only of the bottom clamps $h$, that unite the movable sections of the flasks and the bottoms. The bottom of each flask is thus left to be supported by the fixed section of the flask. Each pipe is now removed by the crane, the sand runs out and is removed from the flasks and the pit, and the above operations are repeated without disturbing the heating-pipes.

It will be seen that by my improvements from the time the flasks are first lowered into position to be suspended and clamped in place, neither the flasks nor their bottoms are moved until a change in the size of pipe is desired. By generating heat at the points (inside the flasks) where it is to be used there is no waste of heat. By the construction of the apparatus I may use, at option, either gas or hot air in the most beneficial manner. There is no time or labor wasted in hoisting the flasks from the pit to dump them.

There is no obstruction from heat or foul gases to the continuous occupation of the molders in and about the pit when inflammable gas is used, so that the heat is generated and applied wholly within the molds. The casting may go on as soon as a portion of the molds are ready to receive the metal without in any way interfering with the molders engaged upon the remaining molds.

By providing the supply-pipe with a large number of heating pipes or attachments for such pipes, (see Fig. 1,) and adjustably and detachably securing the flasks in their suspended positions, it is obvious that the apparatus is adapted to the drying of molds in flasks varying from the smallest to the largest size, which may advantageously be employed without loss of space in the pit, as, owing to their adjustability, the flasks may properly be centered over the branch pipes or around the heating-pipes, which are all in use when the smallest size flasks are employed, and the flasks arranged as close together as may be without interfering with the work in all cases, irrespective of the size of the flasks. When all the heating-pipes are not used, which is the case when large or comparatively large flasks are in position, the surplus heating-pipes may be swung out of the way or removed.

I have described the heating-pipes as extended throughout the length of the molds, and the drying of the molds by an internal fire, as applicable to upright flasks; but, obviously, the heating-pipes need not extend the entire length of the molds, and molds in flasks arranged horizontally, manifestly, may be dried by the burning of gas in the interior of the molds.

As before mentioned, I prefer to make the larger flasks of wrought-iron, because, owing to the great strength of this metal, the flasks may be made thinner than they could be when constructed of cast-iron. Consequently they are lighter, thus lessening labor in opening and closing the flasks, reducing strain on the hinges uniting the sections, on the supports, and on the pit-plates, and at the same time occupying less room in the pit.

Obviously, the fixed sections may be of cast-iron, and the movable or swinging sections of wrought-iron; and it is also obvious that old flasks may have my improvements readily applied thereto, so as to adapt them to be suspended in position. I do not, however, herein claim a wrought-iron flask, or a combined cast and wrought iron flask, as such flasks will constitute the subject-matter of separate applications.

I claim as my invention—

1. The hereinbefore-described improvement in the art of molding and casting pipe, &c., which consists in drying the mold by heat generated within it by burning gas-jets, the flames of which act directly upon the inside of the mold.

2. A molding and casting pit provided with a supply-pipe, and a series of perforated heating-pipes detachably and adjustably connected therewith, substantially as set forth.

3. The combination, substantially as hereinbefore set forth, with a pit or flask support, of a supply-pipe, a flask suspended above the supply-pipe, and a perforated heating-pipe extending from the supply-pipe up into and lengthwise of the flask to dry the mold.

4. The combination, substantially as hereinbefore set forth, of a series of flasks suspended in a pit, a supply-pipe at or near the bottom of the pit, and a series of adjustable perforated heating-pipes, provided with regulating-valves, and passing into the flasks.

5. The combination, substantially as hereinbefore set forth, of the pit, the series of sectional hinged flasks, each detachably and adjustably suspended in the pit by one section, while leaving the remaining section free to be swung upon its hinged connection with said fixed section, the supply-pipe, and a series of adjustable heating-pipes.

6. The combination of the flask and its supporting-bracket, by which to suspend it in position, as set forth.

7. The combination, substantially as hereinbefore set forth, with the pit, of the flasks, their suspending-frames, and clamps by which to adjustably and removably secure the frames in position upon the pit-plates.

In testimony whereof I have hereunto subscribed my name.

HERBERT R. SMITH.

Witnesses:
   C. O. POLAND,
   T. P. OGDEN.